(12) United States Patent
Andersson et al.

(10) Patent No.: US 8,467,167 B2
(45) Date of Patent: Jun. 18, 2013

(54) HVDC FILTER

(75) Inventors: Lars-Tommy Andersson, Ludvika (SE); Britt-Marie Pira, Smedjebacken (SE)

(73) Assignee: ABB Technology Ltd., Zürich (CH)

(*) Notice: Subject to any disclaimer, the term of this patent is extended or adjusted under 35 U.S.C. 154(b) by 926 days.

(21) Appl. No.: 12/097,388

(22) PCT Filed: Dec. 13, 2005

(86) PCT No.: PCT/SE2005/001905
§ 371 (c)(1),
(2), (4) Date: Sep. 4, 2009

(87) PCT Pub. No.: WO2007/069943
PCT Pub. Date: Jun. 21, 2007

(65) Prior Publication Data
US 2010/0002408 A1    Jan. 7, 2010

(51) Int. Cl.
*H02H 1/00* (2006.01)
(52) U.S. Cl.
USPC ........... 361/130; 361/602; 361/604; 206/722; 206/733

(58) Field of Classification Search
USPC .......................... 361/130, 602; 206/722, 723
See application file for complete search history.

(56) References Cited

U.S. PATENT DOCUMENTS

| | | |
|---|---|---|
| 5,777,842 A | 7/1998 | Tsukushi et al. |
| 6,853,541 B2 * | 2/2005 | Anheuer et al. .............. 361/602 |
| 2003/0235026 A1 | 12/2003 | Anheuer et al. |

OTHER PUBLICATIONS

International Search Report, dated Jul. 12, 2006, issued in connection with counterpart International Application No. PCT/SE2005/001905.

* cited by examiner

*Primary Examiner* — Rexford Barnie
*Assistant Examiner* — Toan Vu
(74) *Attorney, Agent, or Firm* — Venable LLP; Eric J. Franklin

(57) ABSTRACT

A filter for an HVDC system. The filter includes a capacitor and a reactor arranged in an indoor location having a first space for erecting filter components. The first space includes a high voltage area and a low voltage area defining a first electric potential direction.

19 Claims, 1 Drawing Sheet

HVDC FILTER

CROSS-REFERENCE TO RELATED APPLICATIONS

This application is the national phase under 35 U.S.C. §371 of PCT/SE2005/001905 filed 13 Dec. 2005.

TECHNICAL FIELD

The present invention concerns a high voltage direct current (HVDC) electric power transmission system. Especially the invention concerns an HVDC system comprising voltage source converter (VSC) containing extinguishable semiconducting elements, such as for instance IGBT. In particular the invention concerns filter means of a HVDC system.

BACKGROUND OF THE INVENTION

In this context the expression classic HVDC comprises an HVDC system containing a current source converter (CSC) containing non-extinguishable semiconducting elements such as a thyristor. The expression light HVDC comprises in this context an HVDC system containing a VSC. For both the classic HVDC and the light HVDC AC filters are necessary to reduce the amount of harmonics injected into the connected AC network. Filters are typically designed as resonance circuit tuned to the relevant order of harmonics. The main components of a filter are capacitors, reactors and resistors. Filters are commonly built out-doors as a part of a sub-station switchyard.

Filters in connection with HVDC systems are known to radiate sound to the environment. Sometimes this radiation may be decreased by means attached directly to the radiating equipment itself. Examples of such means are screens and sound absorbing material. These measures often come into conflict with the need for cooling of the equipment. Such measures also increase the weight of the equipment and may be difficult to apply at high voltage potentials. Therefore, and especially in connection with HVDC Light it is known to house the filter inside a building. An indoor location of a filter offers the advantages of reducing both the audible and the electromagnetic emitted noise. Further an indoor filter equipment is protected from airborne pollution.

When the system voltage is increased the size of a filter increases. For capacitor means it is known to arrange a plurality of capacitor element in a stack. When connected the voltage level increases with the height of the capacitor stack. Typically the height of the main capacitor stack together with the necessary air clearance determines the height of the building. The other components which have a lesser height mostly contribute to the footprint area. The footprint area is the necessary area for spreading out the filter equipment including the necessary air clearance between filter components. When housing a normally designed filter indoor the space efficiency of the building volume is very poor. Only the capacitor uses the height while the other components, together with the air clearance, mainly determine the length and width. Hence, a large volume of the building is not used.

In an indoor solution it is also beneficial to have the main feeder bus indoors; otherwise the reduction of radio interference and the purpose of protection from pollution are not achieved.

It is known to mitigate audible noise by specially designed components which are expensive. It is further known to use material and equipment to make the source of sound less emitting or by screening of individual components. Emission of radio frequencies is known to be reduced by installation of dedicated additional filters. The pollution problem is known to be solved by longer creepage distances for the insulators or by coating for hydrofobicity.

For systems with lower voltage (and power) these problems are less significant.

SUMMARY OF THE INVENTION

The present invention seeks to provide an improved HVDC system with an indoor filter and a method for providing an indoor filter.

This object is achieved according to the invention by a control apparatus or by a method.

According to the invention the filter building is arranged to comprise a first space having a first electric potential direction and a second space having a second electric potential direction where the first electric potential direction is, at least in part, adverse to the second electric potential direction. Each space is arranged for housing a part of the filter equipment and comprises a low voltage area and a height voltage area defining the electric potential direction from low to high voltage level. In an embodiment of the invention the high voltage area of the first space is positioned adjacent to the high voltage area of the second space. In a further embodiment of the invention the high voltage area of the first end second space is common and thus the first and second spaces are overlapping each other. In a further embodiment the first and second spaces are positioned on top of each other.

The principle of the invention is that the filter equipment located in the second space, which normally is the upper space, is mounted upside down, such that the high voltage end is facing downwards. The indoor bus is placed at the high voltage area of the first space and fed directly from the transformer bushings, wall bushings or by cables/terminations. The main capacitor means is suspended from the ceiling above the bus. Thus, the low voltage area of the second space comprises the low voltage end of the capacitor means. In consequence the high voltage area of the second space comprises the high voltage end of the capacitor means. Other components of the filter may be housed on an elevated floor (or floors) along the building walls.

With this arrangement the height of the filter building is the same but the foot-print area is significantly reduced. There are three main objectives with an indoor filter location. These are reduction of audible sound to the environment, reduction of radio interference and reduction of equipment pollution of dust and particles. These entire objectives are achieved by an indoor solution and according to the invention the building volume is reduced.

In a first aspect of the invention the object is achieved by a filter means for a HVDC system the filter means comprising capacitor means and reactor means arranged in an indoor location having a first space for erecting filter components comprising a high voltage area and a low voltage area defining a first electric potential direction, wherein the indoor location further comprises a second space for erecting filter components having a low voltage area and a high voltage area defining a second electric potential direction, and wherein the first electric potential direction is adverse to the second electric potential direction. In an embodiment the high voltage area of the first space is positioned adjacent the high voltage area of the second space. In an embodiment of the invention the second space is located on top of the first space. In a further embodiment the high voltage area of the first space is common with the high voltage area of the second space.

In a second aspect of the invention the objects are achieved by a method for providing filter means for a HVDC system the filter means comprising capacitor means, reactor means and resistor means arranged in an indoor location having a first space for erecting filter components comprising a high voltage area and a low voltage area defining a first electric potential direction, the method comprising, providing a second space for erecting filter components having a low voltage area and a high voltage area defining a second electric potential direction, and orienting the second space such that the first electric potential direction to partly become adverse to the second electric potential direction. In an embodiment the high voltage area of the first space is positioned adjacent the high voltage area of the second space. In an embodiment of the invention the method comprises locating the second space on top of the first space. In a further embodiment the method comprises arranging the high voltage area of the first space and the high voltage area of the second space in common.

BRIEF DESCRIPTION OF THE DRAWINGS

Other features and advantages of the present invention will become more apparent to a person skilled in the art from the following detailed description in conjunction with the appended drawings in which.

DESCRIPTION OF PREFERRED EMBODIMENTS

Figure 1:
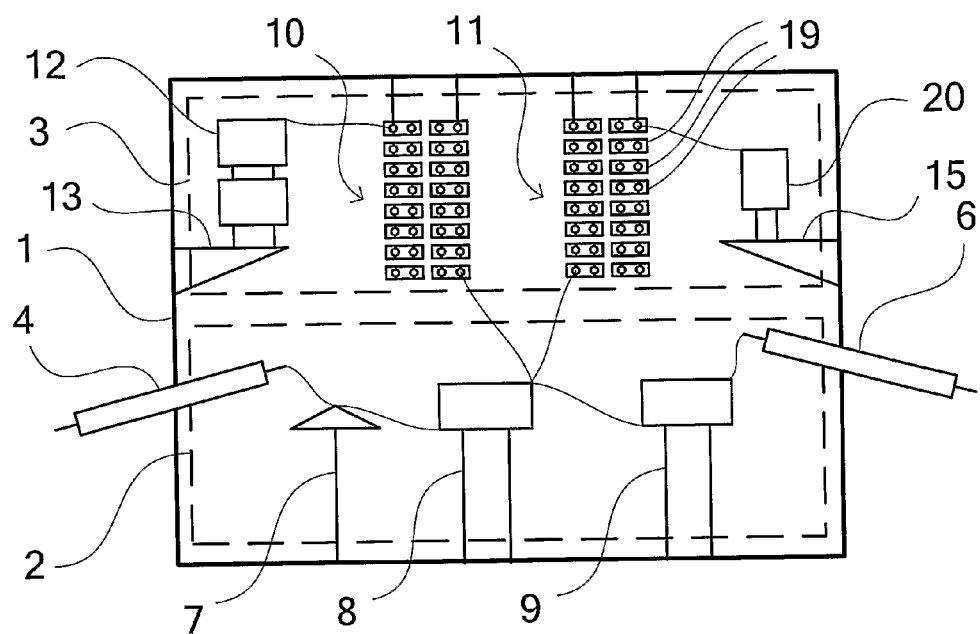
FIG. 1 is an elevation of a filter building according to the invention showing exemplary filter components.
Figure 2:
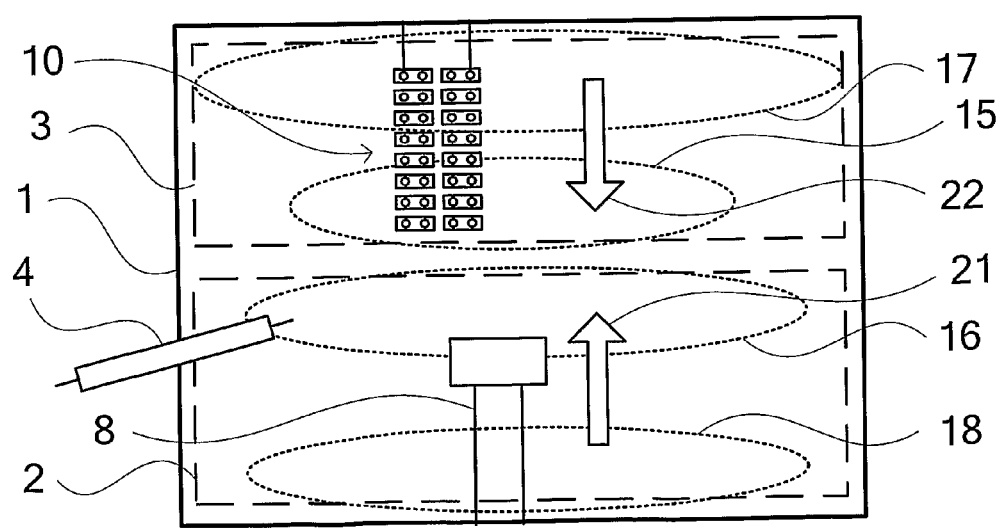
FIG. 2 is an elevation of the filter building showing the characteristic of the first and second spaces.

An indoor filter for a HVDC system is shown by way of example in FIG. 1 and 2. A building 1 for housing filter components comprises a first space 2 having a low voltage level area 18 and a high voltage level area 16 defining a first electric potential direction 21. The low voltage area is arranged to receive the low voltage end of a filter component. The high voltage level area is arranged to receive the high voltage end of a filter component. In the embodiment shown the building also comprises a second space 3 having a low voltage level area 17 and a high voltage level area 15 defining a second electric potential direction 22. The high voltage area and the low voltage area of the second space are equally arranged to receive the high voltage end and a low voltage end respectively of a filter component.

In the embodiment shown the building contains a voltage measuring device 7, a first series reactor 8 and a second series reactor 9 connected to each other. These filter components are located in the first space with their high voltage level end in the high voltage area and their low voltage level end located in the low voltage area of the first space. A first bushing 4 from a transformer (not shown) is positioned with its high voltage terminator located in the high voltage level area of the first space. A second bushing connected to the VSC is positioned with its high voltage terminator also in the high voltage level area of the first space.

Suspended from the ceiling of the building there are a first capacitor stack 10 and a second capacitor stack 11. Each capacitor stack comprises a plurality of capacitor elements 19 arranged adjacent each other in a row. The capacitor stack comprises a high voltage end positioned in the high voltage area of the second space. The low voltage end of the capacitor stack is positioned in the low voltage area of the second space.

Not necessarily but very common a filter arrangement comprises not only capacitor means and reactor means but also resistor means. In the embodiment shown an optional resistor 12 is positioned on a shelf 13 in the second space. A resistor has not a significant low voltage end and a high voltage end but merely a low voltage connection. Suitable therefore is to position the resistor outside the high voltage area of the second space and close to the wall of the building, which is connected to earth. A reactor 14 is positioned on a shelf 20 on the opposite side of the building. Like the resistor the reactor has no significant voltage potential direction. Thus it is convenient to position the reactor close to the wall and out of the high voltage area of the second space.

The improvement of the filter design is according to the invention to position filter component in two layers and turning the second layer components upside down, such that the high voltage end is facing downwards. In comparison to a two story building with a floor in between the arrangement according to the invention leads to a much more compact building and a much more efficient use of the building volume. In a further embodiment of the invention the upper space is lowered such that the high voltage area of the first space is common with the high voltage level area of the second space. The distance between the low voltage level area and the high voltage level area is dependent on the voltage level of the HVDC system itself.

Although favorable the scope of the invention must not be limited by the embodiments presented but contain also embodiments obvious to a person skilled in the art. The building for instance does not have to be a free standing building but be positioned adjacent to the valve building. In such an arrangement the valve building and the filter building have at least one wall in common. Also in this case the two building shear the same roof construction. Further the first and second electric potential direction may be inclined to each other. The demand of being adverse equals that any part of the first and second electric potential direction is adverse. Also the positioning of the first and second space may be adjacent each other in a horizontal direction.

The invention claimed is:

1. A filter for an HVDC system, the filter comprising:
a filter building comprising a grounded structure, the filter building enclosing a first space and a second space, the first space and the second space each comprising a low voltage area in the vicinity of opposite sides of the filter building and a high voltage area arranged with the low voltage area arranged between the high voltage area and the sides of the filter building, such that the low voltage area and high voltage area of the first space and the second space define electric potential direction that are adverse,
a capacitor operatively connected to the filter building such that the capacitor extends from a first of the low voltage areas into a first of the high voltage areas, and
a reactor operatively connected to the filter building opposite the capacitor such that the reactor extends from a second of the low voltage areas into a second of the high voltage areas.

2. The filter according to claim 1, wherein the high voltage area of the first space is positioned adjacent the high voltage area of the second space.

3. The filter according to claim 1, wherein the first space and the second space overlap, whereby the high voltage area of the first space is common with the high voltage area of the second space.

4. The filter according to claim 1, wherein the second space is located on top of the first space.

5. The filter according to claim 1, wherein the capacitor is suspended from a ceiling of the filter building in the second space.

6. The filter according to claim 1, wherein the reactor is positioned on a shelf in one of the first space and the second space.

7. The filter according to claim 1, wherein the filter comprises a resistor which is positioned on a shelf in one of the first space and the second space.

8. A method for providing a filter for an HVDC system, the method comprising:
   providing a filter building comprising a grounded structure,
   providing a first space within the filter building for erecting filter components, the first space having a high voltage area and a low voltage area in the vicinity of a first side of the filter building and a high voltage area arranged between the low voltage area and a second, opposite side of the filter building, the low voltage area and the high voltage area defining a first electric potential direction,
   providing a second space within the filter building for erecting filter components, the second space having a low voltage area in the vicinity of the second side of the filter building and a high voltage area arranged between the low voltage area and the first side of the filter building, the low voltage area and the high voltage area defining a second electric potential direction at least partially adverse to the first electrical potential direction,
   operatively connecting a capacitor to the filter building such that the capacitor extends from a first of the low voltage areas into a first of the high voltage areas, and
   operatively connecting a reactor to the filter building opposite the capacitor such that the reactor extends from a second of the low voltage areas into a second of the high voltage areas.

9. The method according to claim 8, further comprising:
   positioning the high voltage area of the first space adjacent the high voltage area of the second space.

10. The method according to claim 8, further comprising:
    locating the second space on top of the first space.

11. The method according to claim 8, further comprising:
    arranging the high voltage area of the first space and the high voltage area of the second space in common.

12. The method according to claim 8, further comprising:
    extending a first bushing through a wall of the filter building and into one of the high voltage areas, and
    extending a second bushing through a wall of the filter building and into one of the high voltage areas.

13. The filter according to claim 1, wherein the capacitor is operatively connected to a ceiling of the filter building and the reactor is operatively connected to a floor of the filter building.

14. The filter according to claim 1, further comprising:
    a voltage measuring device operatively connected to a same side of filter building as the reactor.

15. The filter according to claim 1, wherein the capacitor and the reactor are arranged such that high voltage ends of the capacitor and reactor are arranged in the high voltage area of the first space and the second space, respectively, and low voltage ends of the capacitor and reactor are arranged in the low voltage area of the first space and the second space, respectively, and the high voltage ends of the bushings are arranged in one of the high voltage areas of the first space or the second space.

16. The filter according to claim 1, wherein two capacitor stacks are operatively connected to the first side of the filter building.

17. The filter according to claim 1, wherein two series reactors are operatively connected to the second side of the filter building.

18. A filter for an HVDC system, the filter comprising:
    a filter building comprising a grounded structure, the filter building enclosing a first space and a second space;
    a first filter component arranged in the first space such that a low voltage end of the first filter component is arranged in the vicinity of a first side of the filter building and a high voltage end of the first filter component is arranged with the low voltage end between the high voltage end and the first side of the filter building, thus creating a high voltage area and a low voltage area of the first space;
    a second filter component arranged in the second space such that a low voltage end of the second filter component is arranged in the vicinity of a second side of the filter building and a high voltage end of the second filter component is arranged with the low voltage end between the high voltage end and the second side of the filter building, thus creating a high voltage area and a low voltage area of the second space;
    wherein the low voltage area and high voltage area of the first space and the second space define electric potential directions that are adverse.

19. The filter according to claim 1, further comprising:
    a first bushing extending through a wall of the filter building and extending into one of the high voltage areas, and
    a second bushing extending through a wall of the filter building and extending into one of the high voltage areas.

* * * * *

UNITED STATES PATENT AND TRADEMARK OFFICE
CERTIFICATE OF CORRECTION

| | | |
|---|---|---|
| PATENT NO. | : 8,467,167 B2 | Page 1 of 1 |
| APPLICATION NO. | : 12/097388 | |
| DATED | : June 18, 2013 | |
| INVENTOR(S) | : Andersson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1373 days.

Signed and Sealed this
Eighth Day of October, 2013

Teresa Stanek Rea
*Deputy Director of the United States Patent and Trademark Office*